United States Patent [19]
Ellis

[11] 4,213,381
[45] Jul. 22, 1980

[54] SLOW COOKING APPARATUS

[76] Inventor: Clarence E. Ellis, 724 Monument Rd., Ponca City, Okla. 74601

[21] Appl. No.: 970,107

[22] Filed: Dec. 18, 1978

[51] Int. Cl.² .................... A47J 37/06; A23B 4/04
[52] U.S. Cl. ............................. 99/446; 99/447; 99/448; 99/482; 126/25 A
[58] Field of Search ............ 126/25 A, 25 R; 99/446, 99/482, 448, 396, 447

[56] References Cited
U.S. PATENT DOCUMENTS

| | | | |
|---|---|---|---|
| 2,262,910 | 11/1941 | Aller | 99/482 |
| 3,375,775 | 4/1968 | Folmar | 99/446 |
| 3,699,876 | 10/1972 | Ellis | 99/396 |
| 3,841,211 | 10/1974 | Ellis | 126/25 R |
| 3,974,760 | 8/1976 | Ellis | 99/482 |

Primary Examiner—Billy J. Wilhite
Attorney, Agent, or Firm—Lawrence L. Colbert

[57] ABSTRACT

Smoldering wood or other solid fuel near the bottom of a vertically elongated enclosure or pit produces heat and smoke which rises freely through the full width of the enclosure or pit to slowly cook food products supported on a plurality of horizontal removable grill racks above the source of heat. A pair of drip collection pans at the bottom of the enclosure or pit on opposite sides of the solid fuel support extend for the full depth of the enclosure or pit. A deflector for drippings having inclined panel portions is arranged above the fuel support and below the lowermost grill rack and diverts food drippings to the two drip collection pans to protect the drippings from contact with the smoldering fuel and preventing excessive heating of the drippings. An increased food holding capacity is obtained in a limited space due to the compactness of the apparatus

1 Claim, 3 Drawing Figures

SLOW COOKING APPARATUS

BACKGROUND OF THE INVENTION

Slow cooking apparatuses for meats including so-called barbecue pits and other like units which employ smoldering wood for fuel producing rising heat and smoke are known in the prior art. Pertinent examples of the known prior art set forth herein under 37 C.F.R. 1.56 include U.S. Pat. Nos. 3,699,876; 3,841,211 and 3,974,760.

In these prior art structures, the food units which are being smoked and cooked are held on removable horizontal racks above the slow smoldering fuel near the bottom of the enclosure, the fuel not being allowed to break into an open flame during the cooking process.

In U.S. Pat. No. 3,699,876, a collection pan for food drippings spans the cooking enclosure above the smoldering fuel and below the lowermost cooking rack. The pan prevents the drippings from falling onto the smoldering fuel and flaming up. One drawback of the arrangement is that the drip pan blocks the rising of heat and smoke in a large central area of the apparatus, thus retarding cooking in this area while allowing the heat and smoke to rise around the margins of the drip pan. Another difficulty with the prior art device is that after a time the drippings collected in the pan become overheated and objectionable fumes are produced which can have an adverse effect on the flavor of the product being cooked. Furthermore, the location of the drip pan in the prior art reduces in a given size cooking apparatus the available space for the removable cooking or grill racks.

SUMMARY OF THE INVENTION

In this invention which essentially is an improvement on the device in U.S. Pat. No. 3,699,876, the drip pan is relocated in the form of two separated pans or tanks at the bottom of the apparatus, on opposite sides of the fuel support and extending from front-to-back of the cooking enclosure. A food drippings deflector is arranged immediately above the fuel support and below the lowermost food support rack to shunt the falling drippings into the two side pans and preventing them from falling onto the smoldering fuel. The arrangement is must more compact and allows the inclusion of at least two more food racks within a given size enclosure. The overheating of food drippings producing undesirable fumes is totally eliminated, and there is less impediment to the free rising of smoke and heat in the apparatus. The overall arrangement in terms of results achieved is a significant advance over the apparatus in U.S. Pat. No. 3,699,876. Cooking is rendered more even and better controlled and the drippings from the food are not allowed to stand for a long period above the source of heat but are immediately deflected laterally in two directions from the heat source into the side collection pans or tanks which are in a relatively cool location.

DETAILED DESCRIPTION

Figure 1:
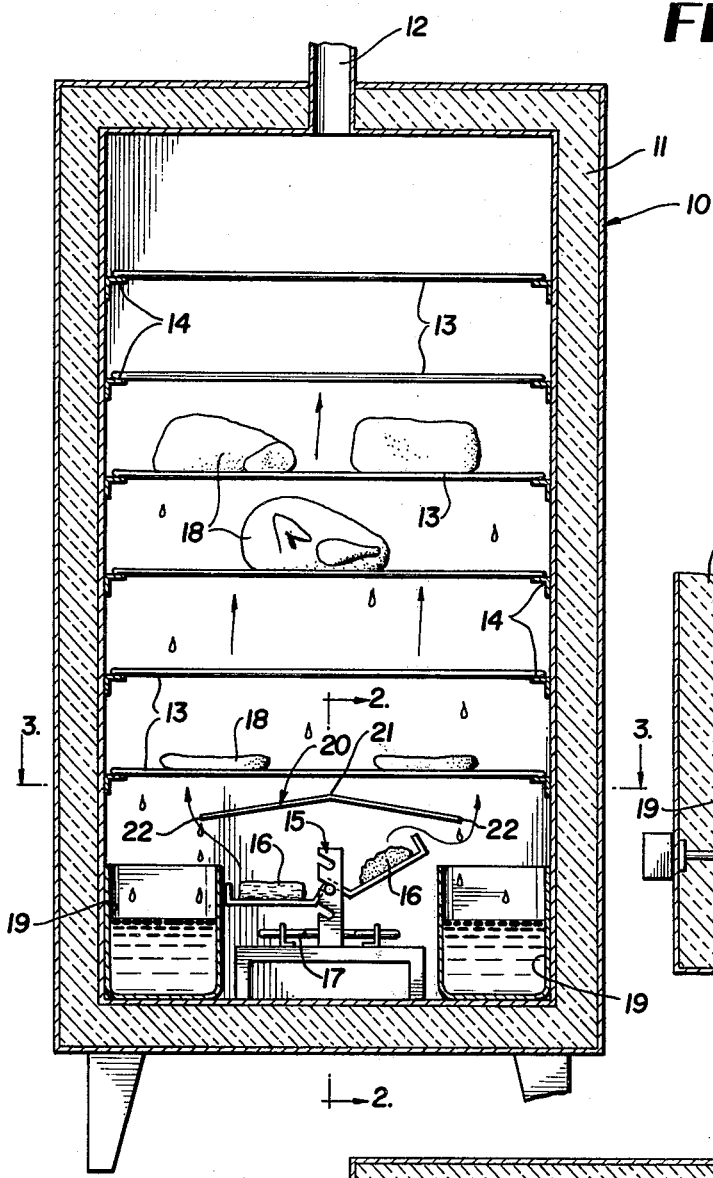
FIG. 1 is a transverse vertical section taken through a slow cooking apparatus according to the invention.
Figure 2:
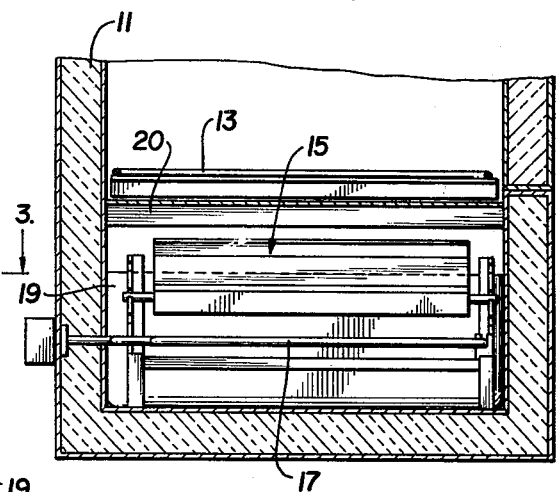
FIG. 2 is a fragmentary front-to-back vertical section taken on line 2—2 of FIG. 1.
Figure 3:
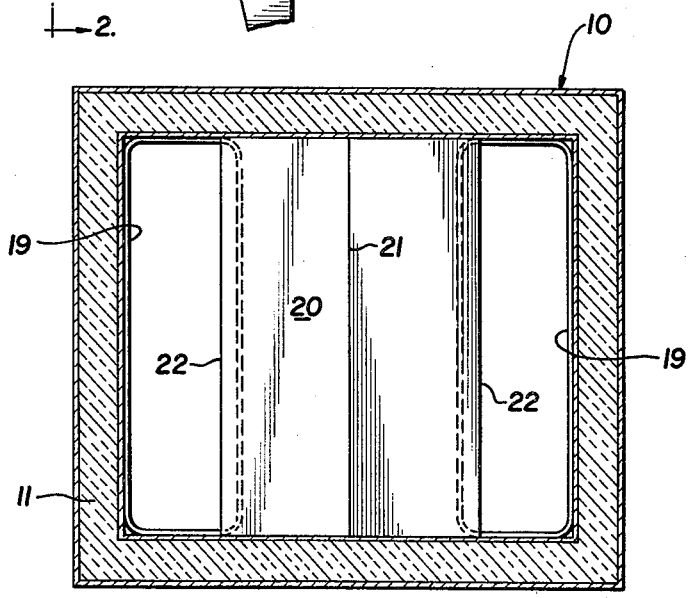
FIG. 3 is a horizontal section taken on line 3—3 of FIG. 1.

Referring to the drawings in detail wherein like numerals designate like parts, the numeral 10 designates a double walled cooking enclosure of rectangular formation including thermal insulation 11 preferably on all sides thereof. A suitably sized smoke and heat vent 12 is provided centrally through the top wall of the enclosure 10. A plurality, such as six, horizontal readily removable cooking or grill racks 13 are provided in spaced superposed relationship in the enclosure 10 and supported on side rails 14 which are fixed to the vertical side walls of the enclosure 10. Due to the compactness of the fuel supporting and associated food drippings deflecting and collection arrangement, to be described, up to fifty percent more cooking space can be realized in a given size enclosure compared to the prior art.

On the bottom wall of the cooking enclosure 10, a seesaw adjustable support means 15 for wood fuel 16 and an associated heating element 17 is provided in accordance with the teachings of U.S. Pat. No. 3,974,760. This mechanism, as explained in the patent, provides for a slow burning or smoldering of the fuel 16 without open flaming thereof so that the heat and smoke produced rises gently and continuously in a controlled manner through the racks 13 to slowly cook and smoke the food products 18 supported on the racks.

An important aspect of the invention is the provision at the bottom of the enclosure 10 and on opposite sides of the fuel support means 15 of a pair of equal size rectangular open top food drippings collection pans or tanks 19 which extend in the front-to-back direction for the full depth of the cooking enclosure. The collection tanks 19 are readily removable through a front closure of the apparatus, not shown.

Just above the fuel support means 15 and tanks 19, centrally of the enclosure 10, is a stationary drippings deflector panel 20 which also extends front-to-back for the entire depth of the cooking enclosure 10. The deflector 20 includes flat inclined sections descending from an apex 21. The front-to-back edges 22 of the deflector 20 overhang the tanks 19 so as to drain the food drippings directly into the tanks while preventing the drippings from ever falling onto the smoldering fuel 16. Additionally, the sloping deflector 20 prevents drippings from standing for any length of time in the hot zone immediately above the fuel and thus prevents the formation of undesirable fumes caused by overheating of the drippings in the prior art. The two tanks 19 receive the falling drippings quickly and the drippings are stored in comparatively cool zones below the rising heat produced from the smoldering fuel 16.

The deflector 20 is supported on the enclosure 10 fixedly in any preferred manner. The lowermost cooking rack 13 can be placed near and above the deflector, as shown. The compact arrangement of the deflector 20, fuel support 15, and tanks 19 in the bottom of the enclosure 20 allow much more space in the enclosure 10 for racks 13 than in the prior art.

The deflector 20 offers less blocking effect to the rising of heat and smoke in the apparatus in comparison to the single drip pan arrangement above the fuel support means in U.S. Pat. No. 3,699,876. The advantages of the improved construction should now be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a slow cooking apparatus of the class having an upright top vented slow cooking enclosure, plural superposed vertically spaced food supports within said enclosure, a heating element and a seesaw support for smoldering fuel above the heating element, the heating element and seesaw support being disposed at the bottom of said enclosure and centered transversely of the enclosure and being substantially below the lowermost food support, the improvement comprising a pair of equal size open top food drippings collector tanks resting on the bottom of said enclosure and abutting the side walls of the enclosure and being elongated in the front-to-back direction and extending substantially for the full front-to-back depth of the enclosure, said tanks being disposed on opposite sides of said heating element and seesaw support, and a unitary peaked drippings deflector fixed within said enclosure between the lowermost food support and the top of said seesaw support and having an apex at the transverse center of the enclosure which is symmetrical in relation to the seesaw support and said tanks, said deflector having sloping panels on opposite sides of said apex which extend laterally outwardly of the seesaw support and somewhat outwardly of the interior longitudinal edges of said tanks to direct food drippings into the tanks, the longitudinal edges of said deflector being equidistantly widely spaced from the vertical sides of the enclosure so as to provide wide unobstructed heat riser passages between the edges of the deflector and the enclosure sides, and the deflector extending for the entire front-to-back depth of the enclosure so that no food drippings can fall onto the heating element and seesaw support.

* * * * *